United States Patent [19]

Habich

[11] Patent Number: 4,552,716

[45] Date of Patent: Nov. 12, 1985

[54] METHOD FOR MANUFACTURING A WIRE MATRIX PRINT WIRE GUIDING DEVICE

[75] Inventor: Adolph B. Habich, Austin, Tex.

[73] Assignee: International Business Machines Corporation, Armonk, N.Y.

[21] Appl. No.: 562,943

[22] Filed: Dec. 19, 1983

[51] Int. Cl.[4] ........................... B29C 7/00; B29C 1/14

[52] U.S. Cl. ................................... 264/328.1; 249/64; 249/142; 264/334; 400/124

[58] Field of Search ..................... 264/1.5, 219, 328.1, 264/328.9, 334, DIG. 63; 249/64, 142; 29/433; 400/124

[56] References Cited

U.S. PATENT DOCUMENTS

| | | | |
|---|---|---|---|
| 2,275,080 | 3/1942 | Kelly | 25/41 |
| 2,829,400 | 4/1958 | Morin . | |
| 3,317,407 | 5/1967 | Kratzmeyer et al. | 204/6 |
| 3,384,335 | 5/1968 | Schwarz | 249/67 |
| 3,385,553 | 5/1968 | Braun | 249/142 |
| 3,509,603 | 5/1970 | Halsall et al. . | |
| 3,526,957 | 9/1970 | Rohrbach | 29/433 |
| 3,545,069 | 12/1970 | Krieger . | |
| 3,893,220 | 7/1975 | Bittner | 29/433 |
| 3,994,381 | 11/1976 | Hebert | 400/124 |
| 4,180,333 | 12/1979 | Linder | 400/124 |
| 4,185,929 | 1/1980 | Hebert | 400/124 |
| 4,218,150 | 8/1980 | Swaim | 400/124 |
| 4,248,823 | 2/1981 | Bader et al. | 264/156 |
| 4,259,653 | 3/1981 | McGonigal | 335/230 |
| 4,309,116 | 1/1982 | Maeda | 400/124 |

FOREIGN PATENT DOCUMENTS

| | | |
|---|---|---|
| 2153005 | 5/1973 | Fed. Rep. of Germany . |
| 1235140 | 6/1971 | United Kingdom . |

OTHER PUBLICATIONS

"Wire Matrix Print Head Guide Means", by R. A. Rachui, IBM Technical Disclosure Bulletin, vol. 23, No. 7B, pp. 3072-3073 (Dec. 1980).

*Primary Examiner*—James Lowe
*Attorney, Agent, or Firm*—Douglas H. Lefeve

[57] ABSTRACT

An apparatus and method for manufacturing a wire matrix print head print wire guiding device which allows automatic insertion of manufacturing wires in a mold, which wires after molding define curved passageways in the molded print wire guiding device through which the print wires may subsequently be automatically threaded. The molding apparatus includes a great enough plurality of thin, apertured inserts for supporting the manufacturing wires so that an aperture in each insert, through which a manufacturing wire passes, directs the manufacturing wire into the corresponding aperture in the next adjacent insert in the mold. The print wire guiding device manufactured with this apparatus and method is inexpensive to assemble with print wires in a wire matrix print head, because the print wires can be threaded by automated means.

4 Claims, 2 Drawing Figures

METHOD FOR MANUFACTURING A WIRE MATRIX PRINT WIRE GUIDING DEVICE

DESCRIPTION

1. Technical Field

This invention relates generally to the manufacture of wire matrix print heads and more particularly to an automated manufacturing method and apparatus for production of a wire matrix print head, wire guiding device in which the print wires can be automatically inserted at final assembly.

2. Background Art (Prior Art Statement)

Representative of the closest known prior art are: U.S. Pat. No. 3,893,220 to J. R. Bittner, filed Aug. 1, 1974, issued July 8, 1975, entitled "Method of Making Wire Matrix Print Head Nozzle", German Offenlegungsshrift No. 2,153,005, filed Oct. 25, 1971, issued May 10, 1973; British Pat. No. 1,235,140, filed Nov. 11, 1968 (foreign priority Nov. 10, 1967), issued June 9, 1971, entitled "Improvements in or Relating to Mosaic Printing Heads"; U.S. Pat. No. 4,309,116 to K. Maeda, filed Aug. 2, 1979 (foreign priority Aug. 2, 1978), issued Jan. 5, 1982, entitled "Print Head Assembly of Wire Dot Matrix Printer"; U.S. Pat. No. 4,180,333 to U. K. E. Linder, filed Mar. 13, 1978 (foreign priority Mar. 15, 1977), issued Dec. 25, 1979, entitled "Bearing for the Printing Head of Matrix Printer, and Printing Head Comprising Such a Bearing"; U.S. Pat. No. 4,218,150 to R. L. Swaim, filed Nov. 20, 1978, issued Aug. 19, 1980, entitled "Matrix Printer"; "Wire Matrix Print Head Guide Means" by R. A. Rachui, *IBM Technical Disclosure Bulletin,* Vol. 23, No. 7B, pages 3072–73 (December 1980); U.S. Pat. No. 4,259,653 to J. J. McGonigal, filed Nov. 22, 1977, issued Mar. 31, 1981, entitled "Electromagnetic Reciprocating Linear Actuator with Permanent Magnet Armature"; U.S. Pat. No. 4,185,929 to D. G. Hebert, filed Mar. 10, 1978, issued Jan. 29, 1980, entitled "Wire Matrix Print Head Assembly"; and U.S. Pat. No. 4,248,823 to L. Bader, et al, filed Dec. 15, 1978, issued Feb. 3, 1981 entitled "Method of Making Ink Jet Print Head". Other patents considered relative to the present invention are: U.S. Pat. No. 2,275,080 to W. Kelly, filed Apr. 17, 1941, issued Mar. 3, 1942, entitled "Machine for Making Concrete Casings"; U.S. Pat. No. 2,829,400 to L. H. Morin, filed Sept. 15, 1954, issued Apr. 8, 1958, entitled "Method for Producing Foamed Plastic Spools"; U.S. Pat. No. 3,317,407 to J. J. Kratzmeyer, et al filed Jan. 14, 1964, issued May 2, 1967, entitled "Method of Making a Punch Block Assemblage"; U.S. Pat. No. 3,384,335 to T. Schwarz, filed Apr. 28, 1965, issued May 21, 1968, entitled "Mold for Making Synthetic Resin Foam Plates"; U.S. Pat. No. 3,385,553 to B. Braun, filed July 26, 1962 (foreign priority July 29, 1961), issued May 28, 1968, entitled "Mold for Producing Plastic Cannulae for Continuous Intravenous Infusion"; and U.S. Pat. No. 3,509,603 to V. M. Halsall, et al, filed July 9, 1967, issued May 5, 1970, entitled "Apparatus for Fabricating Battery Cases".

The advent of low cost home computers, small office computers and word processing equipment has led to a great deal of interest in decreasing the size and cost of printers used as output devices for these data processing and office products. The wire matrix printer has been used extensively as a relatively low cost, high speed output printer for such systems, although there is a continuing effort to reduce the cost of this type of printer even further.

One aspect of wire matrix printers subject to potential further cost reduction is the print head itself, through which a plurality of relatively fine printing wires are supported and moved to cause an impacting contact of an ink containing ribbon against a document such a paper, to mark thereon. As will be understood in greater detail during a discussion of the prior art relative to print heads, this portion of the printer is relatively expensive because technology associated with print heads involves relatively expensive techniques to manufacture the head itself, or rather expensive techniques to assemble the print wires in the head during production of the completed print head assemblies.

U.S. Pat. No. 3,893,220, German Offenlegungsschrift 2,153,005 and British Pat. No. 1,235,140 are each directed to wire matrix print heads in which one aspect of the manufacture of the print head causes the main wire supporting element of the print head to be rather expensive to manufacture, although final assembly of this print head may be rather inexpensive. Specifically, referring for example to FIG. 2 in U.S. Pat. No. 3,893,220 at least two apertured elements support a plurality of "manufacturing wires" which are of a slightly larger diameter than the print wires that will ultimately be used in the completed assembly for printing. These wires are supported inside a mold and, typically, plastic is injected around these wires so that when the wires (and sometimes the apertured supporting elements) are removed, a plastic print head part is produced which includes a plurality of substantially continuous passageways through which the print wires can be inserted during final assembly of the entire print head assembly.

As will be observed in FIG. 1 of U.S. Pat. No. 3,893,220, for example, the path of the print wires is curved so that a relatively small pattern of wires exiting the print head to strike the ribbon fans out at the other end of the print head into much wider spaced group of wires to be connected to the various individual wire driving devices such as solenoid driven levers. Since the wire passageways in the molded plastic part are substantially continuous, insertion of the print wires in the molded print head part during final assembly of the print head assembly can be highly automated and, therefore, relatively inexpensive. However, prior to the injection molding of the print head part containing the wire passageways, the manufacturing wires must be manually threaded through the relatively few apertured wire supporting elements. This manual threading is necessary because of the fact that the curved wires passed through relatively few apertured manufacturing wire supports and the entry and exit patterns of the wires through these supports is substantially different from one support to the next. This manual operation of threading the manufacturing wires prior to injection molding of the plastic print head part is a very significant expense in the cost of the part and, therefore, is a significant cost factor in wire matrix printers.

Numerous alternatives to the particular manufacturing techniques and print head design described above are also found in the prior art. U.S. Pat. No. 4,309,116 shows a two piece print head in which the wires are threaded through significantly spaced apart supports. While it is possible that the molding process might avoid manual wire placement, this approach has the shortcoming of requiring more than one part supporting the wires to be fastened together during final assembly.

There is also no suggestion that the final assembly process would not employ manual placement of the print wires. Similarly, the approach taken in U.S. Pat. No. 4,180,333 also has the clear shortcoming of requiring the joining together of multiple parts to support the print wires in the finished assembly.

Elements supporting the print wires in U.S. Pat. Nos. 4,218,150 and 4,259,653 and in the *IBM Technical Disclosure Bulletin* article by R. Rachui, by virtue of their relatively great distance therebetween, almost invariably require manual, rather than automatic, placement of the print wires during final assembly of the wire matrix print head.

The technique of U.S. Pat. No. 4,185,929 may well alleviate the problem of manual insertion of the print wires during final assembly of the head as well as the problem of manual insertion of the manufacturing wires during molding of the head, but with the structure taught by this Patent, there is multiplicity of individual parts which must be manufactured separately and integrated into one assembly during final assembly.

Finally, U.S. Pat. No. 4,248,823 teaches a method of making an ink jet print head in which rigid manufacturing wires are inserted into a mold relatively unsupported. The molded part made by this process, therefore, includes continuous passageways. While this technique for ink jet print heads may not involve manual insertion of either manufacturing wires or print wires through spaced-apart supports, the passageways formed by this technique are straight, rather than curved as in wire matrix print heads, and the diameter of the manufacturing wires needed to maintain the necessary rigidity to be unsupported is greater than would be required in forming passageways for the print wires in a wire matrix print head.

In summary, therefore, it would be highly advantageous to achieve a low cost, unitary print wire supporting and guiding means for a matrix print head which requires no manual insertion of manufacturing wires during manufacture of the part and no manual insertion of the print wires during assembly of the wires in a wire matrix print head.

DISCLOSURE OF THE INVENTION

Accordingly, an apparatus and method for manufacturing a wire matrix print head print wire guiding device is provided which allows automatic insertion of the manufacturing wires into an injection molding apparatus during manufacture of the print wire guiding device as well as automatic insertion of print wires during final assembly of the print wires into the print wire guiding device in a wire matrix print head assembly. This is accomplished during the manufacturing phase of the print wire guiding device by inclusion of a plurality of relatively thin, removable apertured inserts in the mold which support the manufacturing wires during molding. A sufficient number of apertured inserts in the mold are employed to insure that during automatic insertion of the manufacturing wires through the apertured inserts in the mold, the aperture of each insert through which a manufacturing wire has already passed directs the wire into the hole of the next insert through which the wire is to pass. This overcomes the time consuming and, therefore, expensive step in previous manufacturing processes employing apertured inserts in the molds, wherein it was required to manually thread the manufacturing wires through the apertured inserts.

After the wires are automatically threaded through the plurality of apertured inserts in the mold the material from which the print wire guiding device is to be constructed is injected into the mold. After the material cures the manufacturing wires are retracted from all of the apertured inserts included in the molded part. The mold pieces are then separated and a finished print wire guiding device is available which has not required manual insertion of the manufacturing wires in the apertured inserts. The apertured inserts remain in the mold pieces. Since the apertured inserts are relatively thin, during final assembly of the print wires into the print wire guiding device in the wire matrix print head, the print wires are easily inserted automatically, since the relatively long enclosed wire passageways are interrupted for only very short distances by the gaps in the print wire guiding device left by the apertured inserts in the mold parts. As each wire crosses this relatively short gap it is directed into the next portion of the passageway by the previous portion of the passageway just exited.

The foregoing and other objects, features, extensions, and advantages of the invention will be apparent from the following more particular description of preferred embodiments of the invention, as illustrated in the accompanying drawings.

BEST MODE FOR CARRYING OUT THE INVENTION

Figure 1:
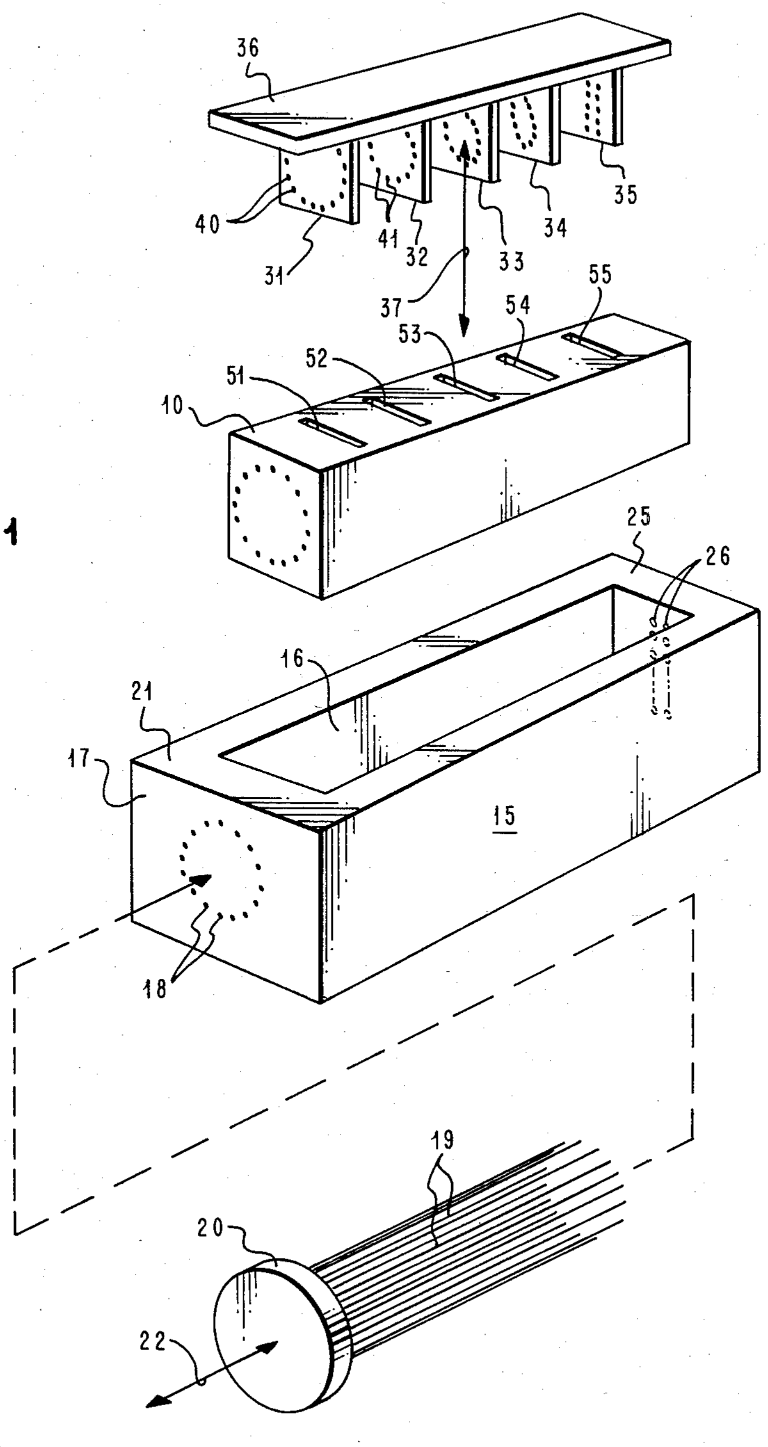
FIG. 1 is a perspective view of the mold pieces and print wire guiding device made therefrom in accordance with this invention.

Referring now to FIG. 1 a perspective view is shown which depicts the general structure of the mold pieces for the automated manufacture of print wire guiding devices which can also be finally assembled with print wires in an automatic manner. The positioning of the parts shown is at the conclusion of the manufacturing cycle for manufacturing a plastic print wire guiding device 10. Accordingly, in describing the manufacturing cycle from beginning to end the reader must ignore the presence of guiding device 10 in FIG. 1 at this time, as it will be described in more detail at the point in the manufacturing process at which it is actually manufactured by injection molding techniques.

In FIG. 1, a mold body 15 is shown having interior walls 16 arranged in whatever geometric pattern is desired to produce a finished part having the desired shape, which can be removed from the mold. For the purpose of simplicity in describing this invention, the geometrical shape of the inside of the mold and, thus, the shape of the part to be molded therein is that of a rectangular solid, although print wire guiding devices having the shape of truncated pyramids and truncated wedges or pie shapes are quite common in wire matrix print head assembles. Any of those shapes and others can be manufactured in a highly automated and economical manner according to the principles of this invention.

At an end 17 of the mold body 15 is a relatively circular pattern of holes 18 through which a plurality of manufacturing wires 19 may be threaded. Wires 19 are unrestrained at the ends thereof which pass through holes 18 but the other ends of wires 19 are attached to an end plate 20. The unrestrained ends of wires 19 are threaded (one time) during the assembly phase of this manufacturing apparatus through holes 18 sufficiently for the wires to be laterally restrained by the relatively thick wall 21 of mold body 15. At this time, assume that the wires 19 are threaded into holes 18 only far enough to provide stable lateral restraint but not far enough to extend into the interior portion 16 of mold body 15.

End plate 20 is connectable to any suitable linear actuation means (not shown) capable of moving end plate 20 and wires 19 in the two directions indicated by arrows 22. Thus, as end plate 20 is moved toward end 17 of mold body 15, wires 19 extend past holes 18 into the interior 16 of mold body 15.

Through an opposite end wall 25 of mold body 15 is disposed another plurality of holes 26 equal in number to the plurality of holes 18 and the plurality of manufacturing wires 19. This set of holes 26 defines the pattern at which the wires in the finished wire matrix print head print wire guiding device will be arranged. For the purpose of this description two parallel rows of holes 26 are shown to produce a similar pattern in the finished molded print wire guiding device, although it will be understood to those skilled in the art that the principles of this invention will apply to substantially any geometric pattern of holes at either end of the mold body 15 and, therefore, the molded print wire guiding device. In understanding this invention, however, it is fundamental to note that since the pattern of holes 18 is substantially different than the pattern of holes 26, the manufacturing wires 19 cannot be automatically threaded into holes 26 simply by movement of end plate 20 toward end 17 of mold body 15. Some means is necessary to thread wires 19 into the geometric pattern of holes 26, which is substantially different from the geometric pattern of holes 18.

This threading process is accomplished automatically by means of a plurality of apertured partitions 31, 32, 33, 34, and 35 which are rigidly mounted to a rigid plate 36. Plate 36 may be attached to another suitable linear actuator (not shown) capable of moving plate 36 and the partitions attached thereto in the directions indicated by arrows 37. Again, ignoring the inclusion of the finished print wire guiding device 10 in FIG. 1 at this time, consider that plate 36 and partitions 31–35 are moved linearly toward mold body 15 so that the partitions fit within the interior 16 of mold body 15. This movement of plate 36 and partitions 31–35, of course, is only effected when manufacturing wires 19 are withdrawn from the interior 16 of mold body 15 into a position whereby they are restrained from lateral movement by holes 18 but do not protrude into the interior 16 of mold body 15. After plate 36 has been moved (downwardly, according to this figure) so that partitions 31–35 are enclosed by mold body 15 the actuator connected to plate 20 is moved to advance plate 20 toward end 17 of mold body 15 so that manufacturing wires 19 protrude into the interior of mold body 15. The arrangement of the apertures in partition 31 is such that, although the geometric pattern is slightly elliptical and not purely circular, the pattern substantially enough resembles the circular pattern in which holes 18 are arranged so that the ends of the manufacturing wires 19 are automatically threaded into the pattern of holes 40 in the apertured partition 31.

Similarly, as movement of end plate 20 continues toward end 17 of mold body 15, the manufacturing wires 19 exit holes 40 in the apertured partition 31 and become automatically threaded into the slightly more pronounced elliptical pattern 41 of holes in the apertured partition 32. This process continues until the wires exit apertured partition 35 in a pattern substantially similar enough to holes 26 in mold body 15 that the wires are also automatically threaded into holes 26, as movement of end plate 20 continues toward end 17 of mold body 15.

Figure 2:
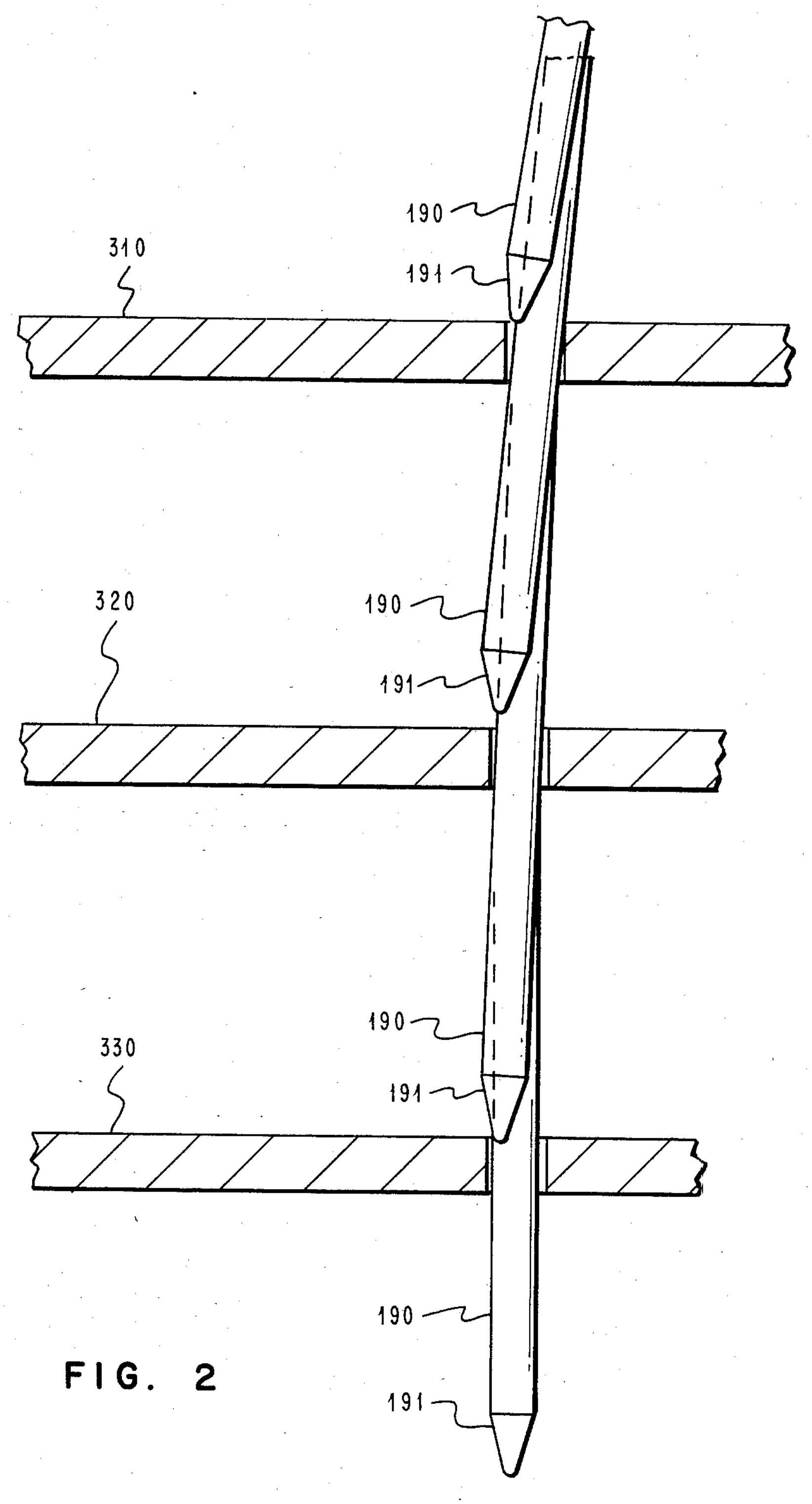
FIG. 2 is an enlarged top or side view which illustrates the automatic insertion of manufacturing wires through apertured inserts that form a curved path prior to the during the molding process for manufacturing the print wire guiding device.

Referring now to FIG. 2 an enlarged view of a single manufacturing wire 190 is shown as it progresses first through an apertured partition 310, then through an apertured partition 320, and finally through an apertured partition 330. With reference to FIG. 2 it will be apparent that as the manufacturing wire contacts each of the apertures in partitions 310, 320, and 330 the relatively pointed end 191 of the manufacturing wire 190 is able to self thread into the next aperture. This is accomplished by including a great enough plurality of partitions and spacing the partitions closely enough together so that the placement of the hole in each succeeding partition through which the manufacturing wire must be threaded is sufficiently close to the trajectory of the manufacturing wire as it nears the aperture so that the end of the manufacturing wire is automatically threaded into the hole by no other means than the number of, and placement of, the partitions and apertures therein and the substantially axial movement of the manufacturing wire toward the apertures.

It will be understood by those skilled in the art that the pattern of wires at one end of the guiding means is substantially different from the pattern of the wires at the other end of the guiding means due to the fact that it is desirable for a wire matrix print head to have a closely spaced pattern of wires, relatively perpendicular to the surface to be printed upon, at the printing end and a relatively spread out pattern of wires at the actuator end to accommodate the driving means (typically electromagnets). As a result of these differing requirements for the pattern of the wires at opposite ends of the print wire guiding means, the wires must follow a curved path. In the preferred embodiment of this invention the manufacturing wires include a substantially pointed end to facilitate the automatic, self threading capability described above. The shorter the radius of the required curved path that the print wires will ultimately take in the finished part, the closer and more frequently spaced the partitions must be in the manufacturing process. As the manufacturing wire traverses from one apertured partition to the next, the displacement of the holes from the inside of one partition to the inside of the next must be less than one-half the wire diameter away from the trajectory at which the wire leaves the aperture in a first partition as it proceeds toward an aperture in the next succeeding partition.

The holes in the partitions may be at the angle through which the wire passes, or the partitions must be sufficiently thin that the hole does not need to be significantly oversized to accommodate the passage of the manufacturing wire through the partition at an angle other than a right angle. If the hole is more than a few thousandths of an inch larger than the manufacturing wire, the molten material used in the molding process (typically plastic) will "flash" into the hole around the wire making it difficult to remove the partitions from the molded part upon manufacture of the molded print wire guiding device.

Referring again to FIG. 1, it will now be understood that for reasons of clarity only a relatively few partitions 31–35 have been shown. Further, for purposes of clarity these partitions have been shown relatively thicker than they might actually appear in a photograph of these parts. It will be understood by those skilled in the art that more apertured partitions than those shown in this figure may be necessary to insure automatic threading of the manufacturing wires through the partitions when relatively short radii are encountered in substantially different wire patterns from one end of a print wire guiding device to the other. When the apertured partitions are made relatively thin, as suggested herein, it is beneficial to make these partitions long enough so that they extend into mating grooves (not shown) in the bottom of the interior 16 of mold body 15 to aid in stablization of these partitions during the molding process. Such an expedient, of course, is often practiced in injection molding techniques and, therefore, will be understood to those skilled in the art.

Accordingly, in operation of the method of this invention plate 36, to which apertured partitions 31–35 are attached, is moved toward mold body 15 so that the bottom ends of the partitions engage slots in the bottom of the interior 16 of mold body 15. Thereafter, a linear actuating force is applied to end plate 20 toward end 17 of mold body 15 which moves the manufacturing wires 19 into the interior 16 of mold body 15 and through the apertures in each of the partitions 31, 32, 33, 34, and 35 and then into the pattern of holes 26 in end 25 of the mold body 15. After the manufacturing wires are threaded and supported in the mold in this manner a molten material from which the part is constructed (typically plastic) is injected into the interior 16 of the mold through ports (not shown) properly disposed in the mold according to well known injection molding techniques which are not a part of this invention. After the molten material has solidified, the linear actuator connected to end plate 20 is operated to retract the manufacturing wires 19 out of the newly molded print wire guiding device 10, but not completely out of end 21 of mold body 15. At this time plate 36 and partitions 31–35 may be retracted away from the mold body 15 and the print wire guiding device 10 may be ejected from the molding apparatus.

It will, thus, be understood that the finished print wire guiding device 10 is a substantially solid molded part having a plurality of passageways therein to support and guide print wires for a matrix print head. Other than the passageways for the print wires, the only voids in the part are the slots 51–55 formed in the part by virtue of the partitions 31–35. Since the partitions 31–35 are shown for clarity in FIG. 1 as being substantially thicker than they would be in a part of this size it will be understood that the slots 51–55 would be substantially thinner than they are shown in this figure for a print wire guiding device 10 of this size. Accordingly, it will be understood by those skilled in the art that automated insertion means can be employed for inserting the print wires during final assembly of the print wire guiding device 10 into a wire matrix print head assembly because the passageways which guide and support the print wires are interrupted only by the very thin slots created by removal of the apertured partitions. Because these slots are very thin compared to the relatively long length of the portions of the passageways between interruptions by these slices, the print wires can be automatically inserted during assembly without any requirement that the print wires be pointed as are the manufacturing wires in the preferred embodiment. Of further assistance in automatically threading the print wires through device 10 is the fact that the manufacturing wires are typically slightly larger in diameter than the print wires so that the print wires can rather easily be moved axially without undue friction during printing.

In summary, an apparatus and method for manufacturing a print wire guiding device for wire matrix printers has been described which is inexpensive to manufacture, in that manual insertion of manufacturing wires is not required, and is inexpensive to assembly with print wires in a wire matrix print head, because the print wires can be threaded by automated means. This is accomplished by the provision of a great enough plurality of thin apertured inserts in the molding apparatus for supporting the manufacturing wires so that an aperture in each insert, through which a manufacturing wire passes, directs the manufacturing wire into the corresponding aperture in the next insert. This self threading capability is also facilitated by the provision of pointed ends on the manufacturing wires.

While the invention has been shown and described with reference to particular embodiments thereof, it will be understood by those skilled in the art that the foregoing and other changes in form and details may be made therein without departing from the spirit and scope of the invention.

I claim:

1. In a method of manufacturing a print wire guiding device for a wire matrix print head, the improvement comprising:

axially projecting a bendable manufacturing wire through an end of a mold body;

disposing a plurality of apertured inserts in said mold body, each of said inserts being closely enough spaced to adjacent ones of said inserts and having apertures closely enough aligned with a desired curved trajectory of said wire so that during said axial projection of said wire an aperture of each of said inserts through which said wire is passed directs said wire into an aperture of a next insert through which said wire is to pass, whereby said wire is self-threaded into a curved disposition through said apertures in each of said inserts by said axial projection thereof;

injecting a plastic material into said mold body;

allowing said plastic material in said mold to harden;

retracting said manufacturing wire from said hardened material; and separating said print wire guiding device from said mold and said apertured inserts.

2. The method of claim 1 wherein said step of disposing said plurality of apertured inserts further comprises:

attaching said inserts to a mold piece separable from said mold body.

3. The method of claim 2 wherein said step of attaching said inserts to a mold piece further comprises:

providing selectable relative movement between said mold piece to which said inserts are attached and said mold body.

4. The method of claim 3 wherein said steps of axially projecting and retracting said manufacturing wire further comprise:

providing selective relative movement between said mold body and said manufacturing wire.

* * * * *